July 4, 1950  T. P. SHAW  2,513,752
COLLOIDAL MILL

Filed July 16, 1946  6 Sheets-Sheet 1

Fig. 1

INVENTOR.
TJERCK POPE SHAW
BY
ATTORNEY

July 4, 1950  T. P. SHAW  2,513,752
COLLOIDAL MILL
Filed July 16, 1946  6 Sheets-Sheet 2

INVENTOR.
TJERCK POPE SHAW
BY

ATTORNEY

July 4, 1950 T. P. SHAW 2,513,752
COLLOIDAL MILL
Filed July 16, 1946 6 Sheets-Sheet 4

INVENTOR.
TJERCK POPE SHAW
BY
ATTORNEY

July 4, 1950

T. P. SHAW 2,513,752

COLLOIDAL MILL

Filed July 16, 1946

INVENTOR.
TJERCK POPE SHAW
BY
ATTORNEY

July 4, 1950  T. P. SHAW  2,513,752
COLLOIDAL MILL

Filed July 16, 1946  6 Sheets-Sheet 6

INVENTOR.
TJERCK POPE SHAW
BY
ATTORNEY

Patented July 4, 1950

2,513,752

UNITED STATES PATENT OFFICE 2,513,752

COLLOIDAL MILL

Tjerck Pope Shaw, Pasadena, Calif., assignor to Morehouse Industries, Los Angeles, Calif., a partnership consisting of Leland P. Smoot and Glenn H. Morehouse Application July 16, 1946, Serial No. 683,920

2 Claims. (Cl. 308—134.1)

This invention relates to an improvement in a material machine, or so-called colloid mill, and particularly to a machine suitable for converting a conglomerate mixture of liquids and soluble solids, or a mixture of different liquids into a homogenous liquid mass in the form of pastes or emulsions.

An object of the invention is to provide a high speed mill as hereinafter described, which is inexpensive and simple to manufacture and in which the parts are accessible and readily assembled, or removed for inspection, adjustment, replacement, or repair.

An object of the invention is to provide a unitary spindle assembly that is readily removable from the mill, with a simple method of mounting and securing means whereby the assembly may be quickly and easily removed and replaced.

An object of the invention is to provide an improved drive and adjustment means for the rotor grinder whereby the parts may be assembled in a unitary assembly and inserted into the mill and easy adjustment of the rotor grinder may be effected to obtain a more accurate milling operation, while the mill is in operation.

A further object of the invention is to provide a high speed mill in which the control of types of grind may be accomplished through a positive precision two-way adjustment of the grinding elements while the mill is in operation.

In earlier devices of this kind disadvantages were found mainly in not being able to control the fineness of the grind, or to eliminate excessive wear on the grinding elements, due to expansion of parts caused by heating during operation.

Another object of the invention is to provide an efficient cooling system so constructed that the regions subject to heating are effectively cooled by the proper direction of the cooling medium as well as the quantity of the cooling medium supplied thereto.

A further object of the invention is to provide means for extracting fumes and vapors arising from materials being ground in the mill.

Other features of the device according to the present invention are more fully set forth in the following description with reference to the accompanying drawings, given by way of example, and in which.

The machine as illustrated in the drawings consists of a base structure A, including an adjustable driving means; a speed-up drive means B; and a reduction assembly C.

Figure 1:
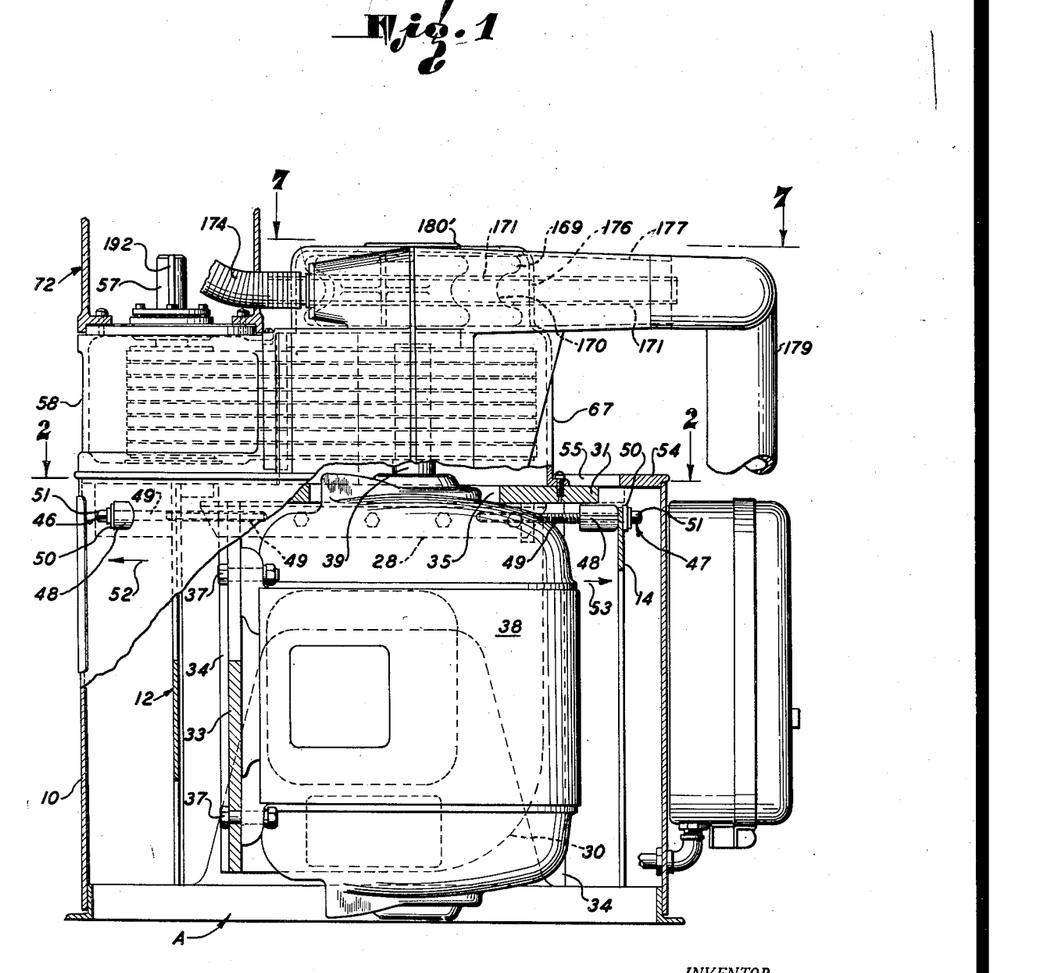
Fig. 1 is a side elevation view, partly in section, of the base and adjustable speed-up drive means embodied in the invention.
Figure 2:
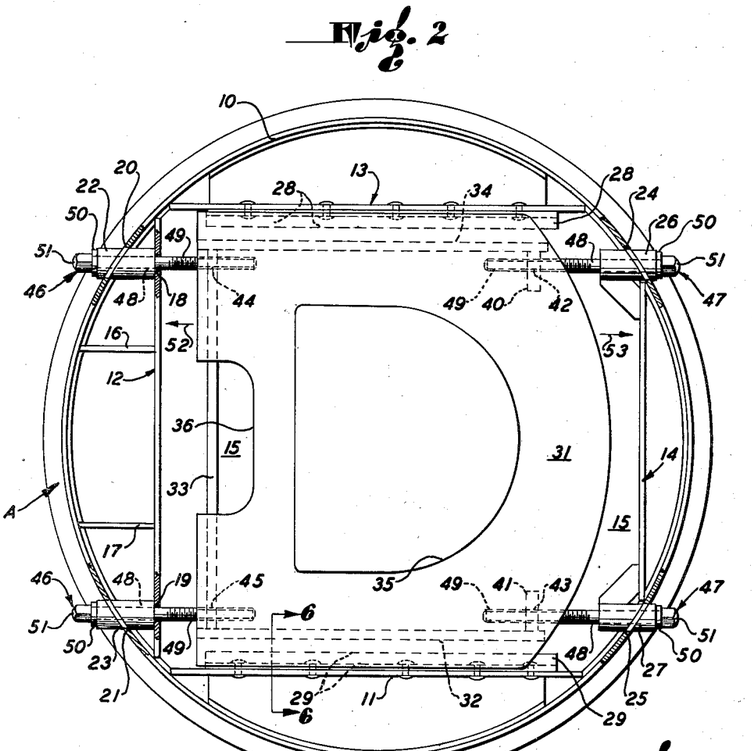
Fig. 2 is a plan view of the base showing the means for adjusting the drive means, taken on line 2—2 of Fig. 1.

The assembly A consists of a circular housing 10, having four rectangular plates 11, 12, 13 and 14 mounted vertically within the housing 10, so as to form substantially a rectangular chamber 15. The plates 11, 12, 13, and 14 are welded to the inner wall of the housing 10.

Within the segment formed by the housing 10 and plate 12 are two stiffener members 16 and 17 which are welded to the inner wall of the housing 10, and the outer wall of the plate 12.

Near the upper and outer edges of the plate 12 are two openings 18 and 19 which are drilled to align with two openings 20 and 21 respectively in the housing 10. Short hollow tube members 22 and 23 are inserted into the openings 20 and 21 so that the opening in the tubular members 22 and 23 align with the openings 18 and 19 and are fastened by means by welding to the plate 12.

In the same horizontal plane, but on the opposite side of the housing 10, are formed two openings 24 and 25 into which are inserted two hollow tube members 26 and 27 and welded to the housing 10.

Horizontally arranged and abutting the top of the plates 11 and 12 are two angle irons 28 and 29, each having one leg positioned in the same horizontal plane so as to serve as slide rails for a motor bracket 30.

The motor bracket 30 is mounted for horizontal adjustment on the slide rails 28 and 29 and consists of a top horizontal plate 31 and three downwardly extending vertical plates 32, 33 and 34. The plates 32 and 34 are arranged parallel to each other and spaced so as to act as guides against the horizontal legs of the slide rails 28 and 29, the plate 33 being arranged to abut the ends of the plates 32 and 34. A large central opening 35 is formed in the top plate 31, with a smaller cut out section 36 to one side and near the edge.

Fastened to the plate 33 of the motor bracket 30, by means of bolts 37 is a motor 38 in such a manner that the shaft 39 extends vertically through the opening 35 in the top plate 31 of the motor bracket 30.

To the underside of the plate 31 and adjacent the plates 32 and 34 are mounted motor take-up blocks 40 and 41 having threaded openings 42 and 43 therein, and being in alignment with the openings in tube members 26 and 27. Threaded openings 44 and 45 are provided in the plate 33 near the upper and outer edges thereof so as to align with the openings provided in the tube members 22 and 23.

Adjustment of the motor bracket 30 and the motor 38 is accomplished by motor take-up screws 46 and 47, which consist of a cylindrical body member 48 having one end 49 threaded, and having an enlargement on the other end to form a flange member 50 and a head 51. The take-up screws 46 and 47 when inserted through the tube members 22, 23, 26 and 27 respectively are screwed into the thread openings 42, 43, 44 and 45 until the flange member 50 abuts the end of the tube members 22, 23, 26 and 27. Should any adjustment of the motor be required, this can be accomplished by turning the take-up screws 46 in clockwise direction and the take-up screws 47 in counterclockwise direction to obtain adjustment in the direction shown by the arrow 52. By reversing the direction of the take-up screws, adjustment in the direction shown by the arrow 53 may be obtained.

The base plate 54, serves as a cover plate for the motor housing 10 and also for a base for the speed-up drive assembly B. It consists of a circular plate having a large central opening 55 and a smaller opening 56 formed to one side near its periphery.

Figure 3:
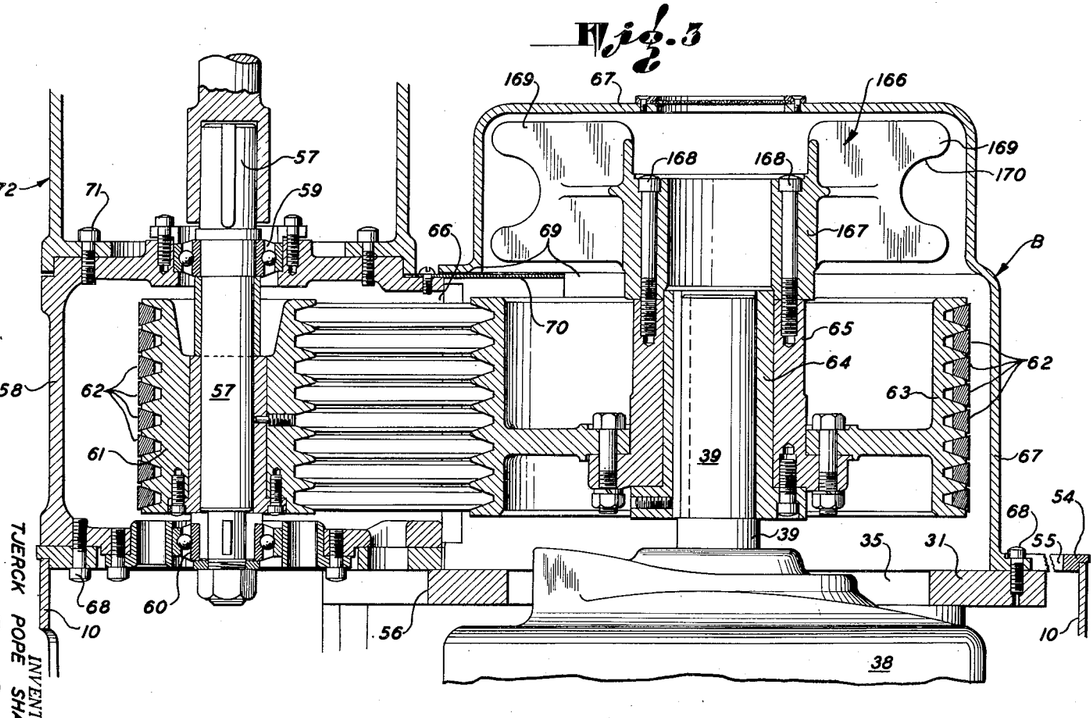
Fig. 3 is an enlarged detailed sectional view of the speed-up drive means and ventilating fan.

The speed-up drive assembly B consists of a vertical shaft 57 supported in a substantially cylindrical housing 58, by bearings 59 and 60, and carries a pulley 61 driven through V-belts 62 by a driving pulley 63 keyed to the extended portion of a motor shaft 39 by means of a bushing 64 and an adapter 65.

The inner portion of the housing 58 is cut away to form the opening 66 for the passage of the V-belts 62. Surrounding the pulley 63 and extending through the opening 55 of the base plate 54 is a housing 67 which is fastened to the motor bracket 30 by means of bolts 68 so as to be adjusted with the motor 38 and motor bracket 30. The housing 67 has a portion adjacent the housing 58 also cut away to form an opening 69 for the passage of the V-belts 62. A cowling 70 is so formed and fastened to the housing 58 to surround the V-belts 62 and telescope through the opening 69 of the housing 67 when the housing 67 is moved by the adjustment of the motor 38 in either direction as indicated by arrows 52 and 53.

Figure 4:
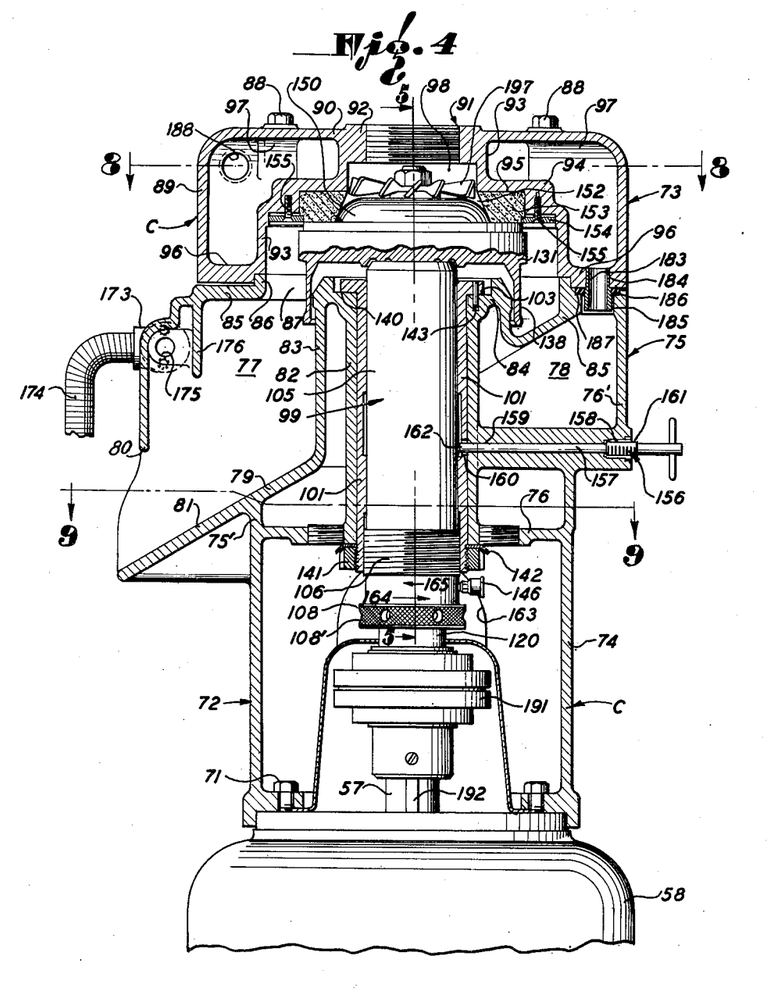
Fig. 4 is a vertical detailed sectional view of the reduction assembly.

The reduction assembly C of my invention is mounted on the speed-up drive housing 58 and held rigidly thereto by bolts 71, and consists of a pedestal portion 72 and a cap member 73. The pedestal 72 is formed with a lower hollow cylindrical base portion 74 which is concentric with the extended portion of the speed-up drive shaft 57, and an upper hollow cylindrical portion 75, having a dividing wall 76 between them. The cylindrical portion 75 adjacent the dividing wall 76 is formed similar to a turbine by having two tubular portions 191 tangentially along opposite sides of the wall and extending in opposite directions to each other and provided with inlet openings 190 to the chamber 78. The upper hollow cylindrical portion 75 is divided into two chambers 77 and 78 by a diagonal portion 79 extending from a point adjacent the upper part of cylindrical portion 75 on one side to a point adjacent the dividing wall 76 on the other, where it extends outwardly beyond the outer periphery of the wall 75' through an opening 80 to form the spill-way 81.

The dividing wall 76 is provided with a central open-ended tube portion 82 which extends upwardly through the chamber 78, partition 79 and chamber 77. The partition 79 likewise has an upwardly projecting tube portion 83 which is concentric to the tube portion 82, and integrally connected to it by a top wall member 84.

To provide a seat for the cap member 73, the wall 75 has an annular flange member 85 extending inwardly with an upturned lip portion 86 and provides with the wall of the tube member 83 a passage 87.

Figure 8:
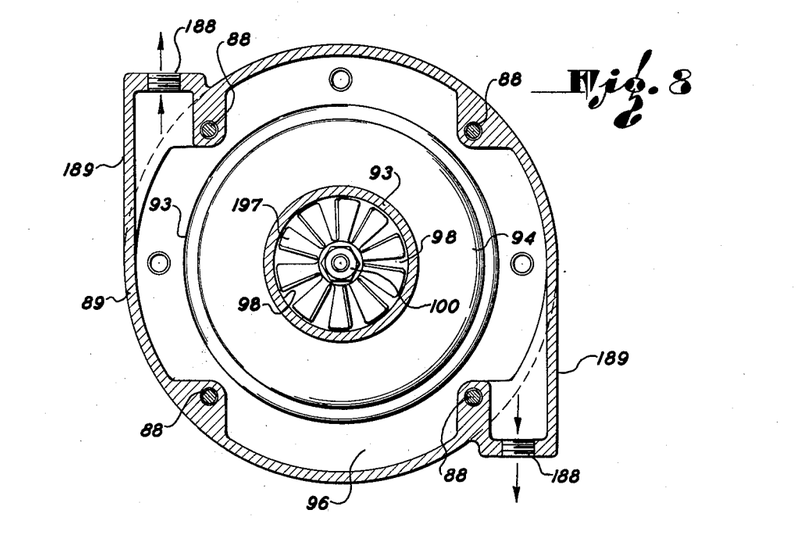
Fig. 8 is a sectional plan view of the cap member, taken on line 8—8 of Fig. 4; and, Fig. 9 is a sectional plan view of the reduction unit taken on line 9—9 of Fig. 4.

The cap member 73 is removably bolted to the pedestal 72 by bolts 88 and comprises an upstanding cylindrical wall 89 closed at the top by a horizontal wall 90; the upper portion of cap member 73 is formed similar to a turbine by having two tubular portions 189 tangentially along opposite sides of the wall and extending in opposite directions to each other and providing outlet openings 188 from the chamber 97; the top wall 90 has a central threaded opening 91 in the boss portion 92. Integral with the top wall 90 and extending downwardly from the boss portion 92 is a hollow tubular portion 93 which is stepped outwardly at 94 so as to form on its lower face a seat 95. An annular flange 96 is integral with the outer wall 89 and the tubular portion 93 so as to form with the top wall 91 a liquid chamber 97.

When the cap member 73 is bolted in place to the pedestal 72, it forms a grinding chamber 98 which is opened at the top through the tubular member 93 and the opening 91, and through the bottom by the passage 87, chamber 77 and opening 80.

Figure 5:
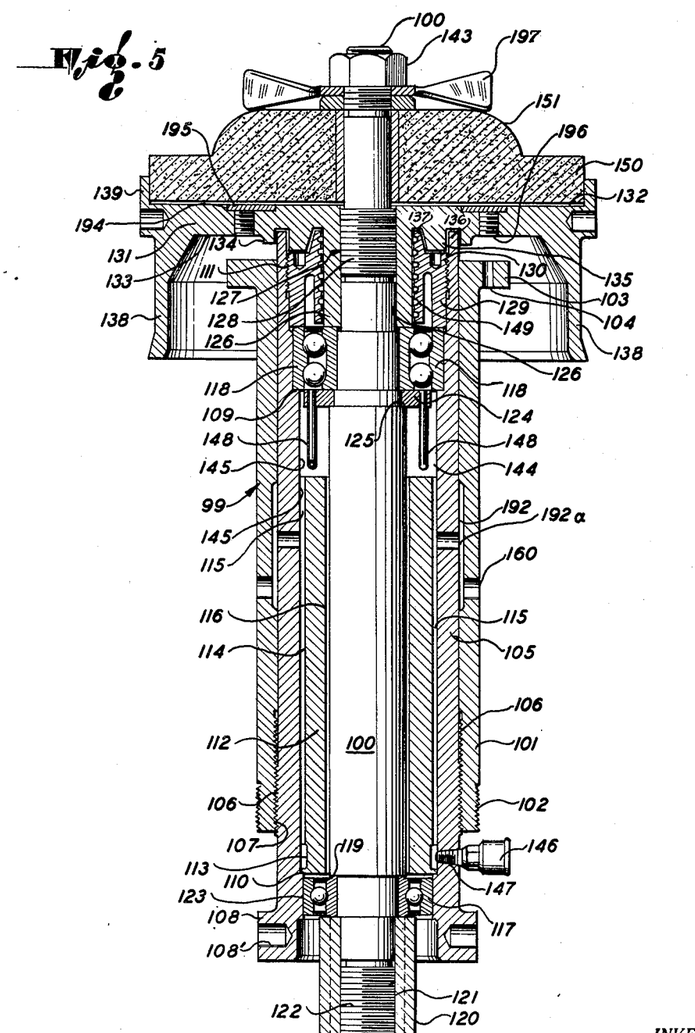
Fig. 5 is an enlarged detailed sectional view showing the spindle assembly of the reduction assembly, taken on the line 5—5 of Fig. 4.
Figure 6:
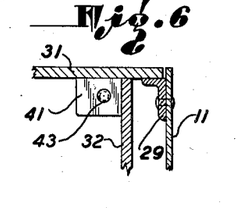
Fig. 6 is a fragmentary view of the base, taken on the line 6—6 of Fig. 2.

For the purpose of mastication of the material being treated, a unitary spindle assembly, generally designated at 99, is mounted in the pedestal 72, being inserted in the opening provided in the tubular member 82, and having a shaft 100 which cooperates with a splined adapter 120 and coupling 191 to be driven by the speed-up shaft 57 by means of keys 192. An impeller 197 is mounted on the upper end of the shaft 100 and held rigidly thereto by lock nut 142, to aid in delivering material to the grinding chamber.

An important feature of my invention resides in providing a unitary spindle assembly 99 that comprises a positive two-way vertical adjustment of the rotor grinder through the access opening 163 while the machine is in operation, and is accomplished by having a tubular bearing liner 101 with external threads 102 formed on its lower end, and a radial flange member 103 with dowel openings 104 formed on its upper end; an adjusting sleeve 10 insertable into the bearing liner 101 and having external threads 106 formed on its lower end for cooperation with the internal threads 107 on the bearing liner 101. The adjusting sleeve 105 has a radial flange member 108 formed on its lower end with openings 108' extending radially from its periphery. The internal bore of the adjusting sleeve 105 is stepped so as to form shoulders 109 and 110 and an internal threaded portion 111 at its upper end. Insertable into the bore of the adjusting sleeve 105, with a light pressed fit, is a grease deflector 112, which engages and seats on the lower shoulder 110. The grease deflector 112 has formed on the lower end of its outer wall a circumferential groove 113 and axially formed slots 114 which extend from the groove 113 to the upper end of the grease deflector so as to form with the internal bore of the adjusting sleeve 105, grease ducts 115. A shaft 100 is rotatably supported in the adjusting sleeve 105 by bearings 117, and 118, which are of well known commercial make consisting of balls, inner and outer races. The inner race of the bearing 117 engages a downwardly presented shoulder 119 formed on the shaft 100 and is retained in place by a splined adapter 120 which has internal threads 121 that cooperate with the external threads 122 formed on the lower end of shaft 100. The outer race of bearing 117 has a light sliding fit with the bore 123 formed in the adjusting sleeve 105. The inner race of bearing 118 abuts a grease pick-up ring 124 that engages an upwardly presented shoulder 125 on the shaft 100 and together they are held in place against the shoulder 125 by a tubular member 126a, through the cooperation of an internal thread 127 formed in the tubular member 126 cooperating with the intermediate threaded portion formed on the shaft 100.

The shaft assembly is held in place in the adjusting sleeve 105 by a grease retainer 129 of the comb type, which clamps the outer race of bearing 118 against the upwardly presented shoulder 109 of the adjusting sleeve 105 by the cooperation of the external threaded portion 130 formed on the grease retainer 129 with the internal threaded portion 111 formed on the adjusting sleeve 105. The tubular member 126 has on its upper end a radial flange member 131 that has a horizontal seat 132 formed on its upper side, and on the lower side 133 are formed two annular wall members 134 and 135 arranged concentric with the tubular member 126. The two annular wall members 134 and 135 are so arranged that they cooperate with the upper end portion 136 of the adjusting sleeve 105 and the upper end portion 137 of the grease retainer 129 to form a labyrinth. The periphery of the flange member 131 is formed with a downwardly marginal skirt 138 and an upstanding lip portion 139.

The unitary spindle assembly 99 may be mounted in the open-ended tube member 82 of the pedestal 72, with the flange member 103 of the bearing liner 101 resting on the seat 140 and rigidly locked to the pedestal 72 against longitudinal movement by a lock washer 142 and a lock nut 141 by the cooperation of the internal threads 141' formed in the lock nut with the external threads 102 formed on the bearing liner 101. Dowel pins 143 are inserted in the openings 104 to retain the bearing liner 101 from rotation within the tube member 82.

A novel means of lubrication is provided in the unitary spindle assembly 99, by providing an annular chamber 144 between the inner wall 145 of the adjusting sleeve 105 and the shaft 100 and adapting the assembly to contain lubricant by a suitable admitting fitting 146 mounted in the threaded opening 147 in the adjusting sleeve 105, and aligned with the groove 113 formed in the grease deflector 112. Located in the annular chamber 144 and depending from the grease pick-up ring 124 are two grease pick-up tubes 148, the lower ends of which are opened in the direction of rotation of the shaft 100 to deliver lubricant from the annular chamber 144 to the upper bearing 118. A slight clearance 116 is provided between the grease deflector 112 and the shaft 100 for the passage of lubricant from the annular chamber 144 to the lower self-sealing bearing 117 where it is confined by this self-sealing bearing 117. Lubricant is prevented from flowing on to the spillway 81 by the oil grooves 149 formed in the bore of grease retainer 126 and the labyrinth formed by the lower side 133 of the flange member 131. In order to allow an easy adjustment of the rotor grinder 150 within the bearing liner 101, openings 192 are provided in the adjusting sleeve 105 that communicates with the grease duct 115 and allows lubricant to flow to a groove 192a formed in the bearing liner 101.

A rotor grinder 150 is mounted on the shaft and seats on the radial flange member 131 in the grinding chamber 98 and has a frusto-conical top portion 151 that projects upwardly to cooperate with an inclined face 152 of a stator grinder 153, that is demountably and rigidly held against the seat 95 in the grinding chamber 98 by an annular ring 154 bolted to the cap by bolts 155. The rotor grinder is fixed to the shaft by nut 143.

As a means to prevent the adjusting sleeve 105 from accidental rotation, a set screw 156 is provided with an elongated shank 157 which leads through aligned openings 158 and 159 that are formed in the walls 76' and 82 of the pedestal 72, and through opening 160 in the bearing liner 101. The opening 158 is threaded to cooperate with a threaded portion 161 on the shank 157. When the set screw 156 is in locked position, the inner end 162 abuts against the side wall of the adjusting sleeve 105.

It will now be apparent from the foregoing description that a unitary spindle assembly 99 has been devised in which a positive two-way vertical adjustment can be made of the rotor grinder, by disengaging the set screw 156 and inserting a tool through the access opening 163 into openings 108' and turning the adjusting sleeve 105 in the direction indicated by the arrow 164 to effect a vertical adjustment of the shaft 100 and rotor grinder 150 upwardly, through the shoulder 109 on the adjusting sleeve 105 abutting the bearing 118. By the rotation of the adjusting sleeve 105 in the direction indicated by the arrow 165, the shaft 100 and rotor grinder 150 are adjusted vertically downward by the grease retainer 126 abutting the bearing 118.

Figure 7:
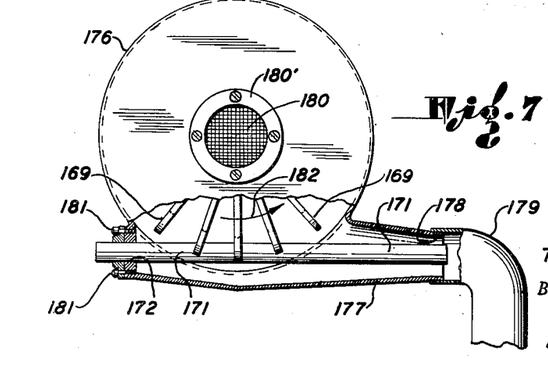
Fig. 7 is a plan view, partly in section, showing means for eliminating fumes, taken on the line 7—7 of Fig. 1.

To eliminate obnoxious odors being expelled from the mill during the treatment of different types of material, I provide a means for extracting fumes and vapors from the mill by an ejector means 166. The ejector means 166 comprises a hub member 167 fastened to the pulley adapter 65 by means of bolts 168 and having radially extending blades 169 that are arranged in vertical planes; the periphery of the blades have slots 170 to partly encase a nozzle 171 which lies tangential to the blade 169 in the slots 170 by projecting into the opening 172 of the housing 67 and fastened to the housing by screws 181. The outer end of the nozzle 171 is connected to a gooseneck 173 by a flexible hose 174 so as to be in communication with the opening 175 that is formed in the pedestal 72 above the spillway 81. The opening 175 is partially separated from the chamber 77 by a vertical baffle 176. The housing 67 is formed substantially circular but has an elongated tubular portion 177 tangentially along one side, to provide for the openings 172 and 178. An opening is provided in the top of the housing 67 for the admission of air into the housing through a screen 180'.

When the motor 38 is operated, the blades 169 rotate in the direction indicated by the arrow 182, creating a suction at the inner end of the nozzle 171 to withdraw fumes and vapors from the mill through the opening 175, gooseneck 173, and flexible hose 174. Simultaneously, air is taken in through the opening 180 and mixed with the fumes and vapor and discharged through the opening 178 and discharged pipe 179.

Figure 9:
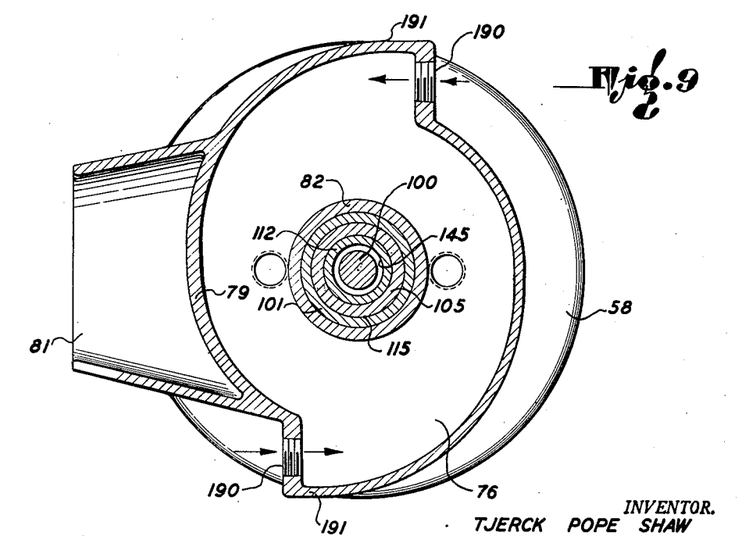

My invention further provides a novel liquid cooling chamber which surrounds the grinding chamber 98 to maintain a more constant temperature and eliminate excessive expansion of the parts, due to heating during operation, thus maintaining the desired spacing of the grinding elements as well as preventing excessive wear. The chamber 97 is connected to the chamber 78 by gland connections 183 which are fitted into openings 184 in the wall 96 of the cap member 73 and project into aligned openings 185 formed in the wall 85 of the pedestal 72 so that fluid may circulate from one chamber to the other. A gasket 186 surrounds the gland connections and fits into a counterbore 187 to act as a seal. The lower portion of the pedestal 72 being formed similar to a turbine and cooling liquid supplied tangentially through the openings 190, from a source not shown, forces the liquid to circulate in a whorling manner through the chamber 78 thereby scouring the walls of the chamber to maintain a more even temperature. The liquid courses its way upward through the gland connections 183 to the chamber 97 and because of its construction the liquid is forced to circulate in a whorling manner to be discharged tangentially through the discharge openings 188.

In order to extract the rotor grinder 150 from its seat 132, a circular groove 194 is formed in the flange member 131 into which a ring 195 is inserted and by the pressure that can be applied by bolts, not shown, inserted into the threaded openings 196 that communicate with the groove 194, the rotor grinder 150 is readily and easily raised from its seat 132.

In the foregoing description I have described a specific horizontally adjustable drive means capable of driving both a speed-up drive means and a fume ejector means; the speed-up drive means in turn drives a rotor grinder in the reduction portion of the mill through a coupling and splined adapter. The rotor grinder is mounted on a shaft journaled in a unitary spindle assembly that provides a positive two-way adjustment of the shaft and a lubricating chamber, but I do not wish to limit myself to the exact details of construction set forth as they may be modified in any manner compatible with the principles of the invention.

The invention may be used for grinding dry materials as well as wet materials. Also if a material which is to be ground must be heated, the passages through which the cooling fluid flows may be used for flowing a heating fluid, thus heating the material to the desired temperature.

I claim as my invention:

1. In a colloid mill having a base including a tubular portion: a vertically adjustable rotor shaft assembly comprising an adjusting sleeve; a plurality of bearing elements carried by said sleeve for rotatably supporting said rotor shaft at spaced points; a tubular lubricant deflector around said shaft within said sleeve extending between the bearing elements; lubricant supply means for admitting lubricant to the interior of said sleeve adjacent one of said bearing elements; a channel in the exterior surface of said deflector for conducting admitted lubricant along the interior of the sleeve to a point adjacent another bearing element; a bearing liner adapted to be adjustably assembled around said adjusting sleeve after said bearing elements have been mounted on said rotor shaft and placed in said adjusting sleeve, said assembly being insertable as a whole into said tubular portion; and means securing said bearing lining against relative axial movement with respect to said tubular portion.

2. In a colloid mill having a base including a tubular portion: a vertically adjustable rotor shaft assembly comprising an adjusting sleeve; a plurality of bearing elements carried by such sleeve for rotatably supporting said rotor shaft at spaced points; lubricant supply means for admitting lubricant to the interior of said sleeve adjacent one of said bearing elements; a tubular lubricant deflector around said shaft within said sleeve extending between the bearing elements and cooperating with said sleeve to form a lubricant flow passage from said lubricant supply means to a point adjacent another bearing element; a bearing liner adapted to be adjustably assembled around said adjusting sleeve after said bearing elements have been mounted on said rotor shaft and placed in said adjusting sleeve, said assembly being insertable as a whole into said tubular portion; and means securing said bearing lining against relative axial movement with respect to said tubular portion.

TJERCK POPE SHAW.

REFERENCES CITED

The following references are of record in the file of this patent:

UNITED STATES PATENTS

| Number | Name | Date |
| --- | --- | --- |
| 821,421 | Kitto | May 22, 1906 |
| 960,893 | Gore | June 7, 1910 |
| 1,220,147 | Wear et al. | Mar. 20, 1917 |
| 1,738,288 | Eppenbach | Dec. 3, 1929 |
| 2,136,214 | Keith | Nov. 8, 1938 |
| 2,147,821 | Morehouse | Feb. 21, 1939 |
| 2,259,967 | Vogel-Jorgensen | Oct. 21, 1941 |
| 2,296,564 | Morehouse | Sept. 22, 1942 |
| 2,389,816 | Richardson | Nov. 27, 1945 |

Certificate of Correction

Patent No. 2,513,752                                 July 4, 1950

TJERCK POPE SHAW

It is hereby certified that error appears in the printed specification of the above numbered patent requiring correction as follows:

Column 4, line 74, for "sleeve 10" read *sleeve 105*; column 5, line 34, for "126a" read *126*; column 8, list of references cited, after line 68, insert the following—

2,402,170     Lund ---------------------------------------- June 18, 1946 and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*